Feb. 20, 1940.　　J. E. SMITH　　2,190,891
BUMPER GUARD
Filed Dec. 27, 1938
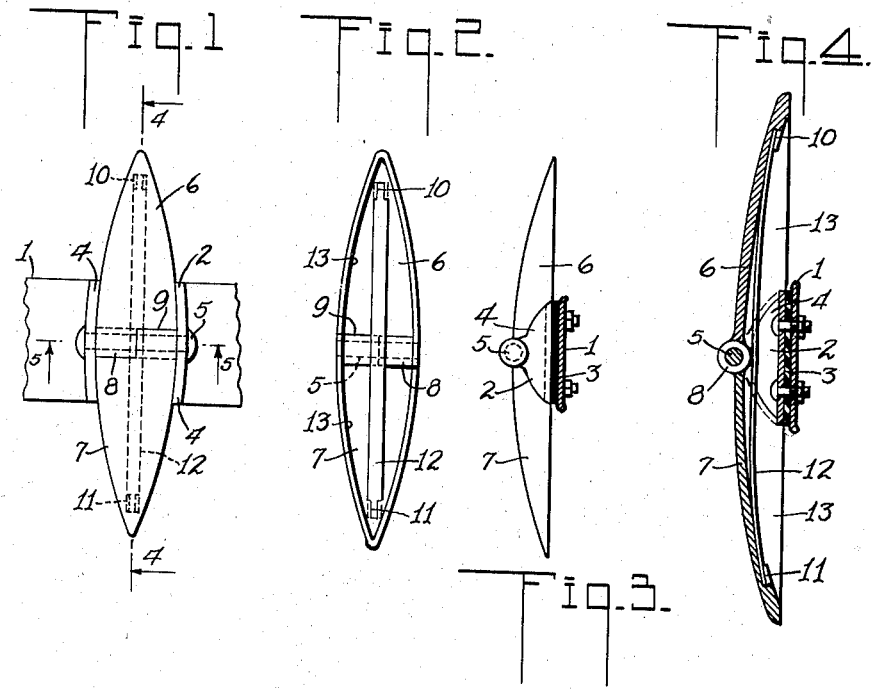
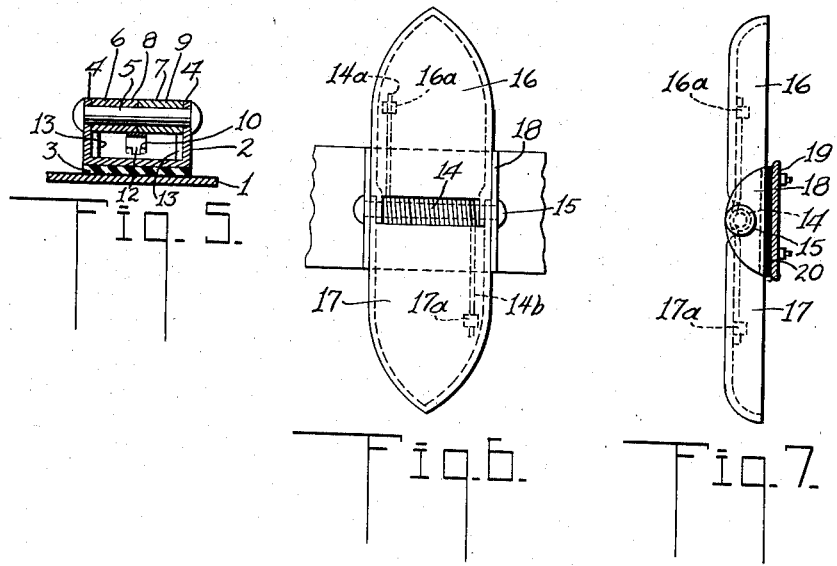
INVENTOR.
JAMES E. SMITH
BY
ATTORNEYS.

Patented Feb. 20, 1940

2,190,891

UNITED STATES PATENT OFFICE 2,190,891

BUMPER GUARD

James E. Smith, San Francisco, Calif.

Application December 27, 1938, Serial No. 247,861

1 Claim. (Cl. 293—55)

My invention relates to improvements in a bumper guard, and it consists of the combinations, constructions and arrangements hereinafter described and claimed.

The bumpers of various makes of automobiles are disposed at different elevations above the ground. When two cars collide with each other, therefore, the bumpers will pass each other and will not protect the cars against damage. To overcome this difficulty, bumper guards have been attached to bumpers to stop the bumpers from passing each other. These guards are of a rigid construction and when two cars bump into each other, the body springs of both cars will frequently give sufficiently to permit the guard of one car to over-ride or under-ride the bumper of the other car and thus lock the two cars together. It is difficult to disentangle the two locked cars, and the bumper guard is usually bent out of shape during the process and this necessitates the purchasing of a new guard.

The principal object of my invention is to provide a bumper guard consisting of upper and lower hinged sections with a spring that will yieldingly hold the sections in a vertical position. The sections normally bear against the supporting bracket and when resisting a force directed against the car will not move and therefore will function in the same manner as a standard bumper guard. Should either the upper or lower section of the guard become engaged with the bumper or other portion of an adjoining car, it is merely necessary to back the first car away from the one with which it is interlocked and the spring hinge will permit the engaged bumper guard section to swing and become freed without damage to the guard section. As soon as the section is freed, the spring will instantly return it to normal position. The spring hinge permits the caught section to swing through an arc of more than 90° if necessary, and this will prevent the upper guard section, for example, from supporting the bumper or other portion of the adjacent car during the time required to free the section.

A further object of my invention is to provide a device of the type described that is extremely simple in construction and is durable and efficient for the purpose intended. The device makes use of a rubber mounting to eliminate any vibration noise.

Other objects and advantages will appear in the following specification, and the novel features of the device will be particularly pointed out in the appended claim.

My invention is illustrated in the accompanying drawing forming a part of this application, in which Figure 1 is a front elevation of the device shown operatively applied to an automobile bumper;

Figure 2 is a rear elevation of the bumper guard without the supporting bracket or bumper being shown;

Figure 3 is a side elevation of Figure 1;

Figure 4 is an enlarged sectional view substantially along the line 4—4 of Figure 1;

Figure 5 is a transverse section substantially along the line 5—5 of Figure 1;

Figure 6 is a front elevation of a modified form of the invention; and

Figure 7 is a side view of Figure 6.

In carrying out my invention, I make use of a standard bumper 1 shown in detail in Figures 1 to 5 inclusive. A bracket 2 is mounted on the bumper and Figure 5 shows a rubber washer or base 3 disposed between the bracket and the bumper to deaden the noise. The bracket has two wings 4 and a rivet 5 is disposed between and carried by the wings.

The bumper guard is composed of an upper section 6 and a lower section 7. Each section is identical and carries a bearing that extends half way across the central portion of the section. The bearing for the section 6 is indicated at 8 and the bearing for the section 7 is indicated at 9. The rivet 5 passes through both aligned bearings and rotatably supports the sections. The inner ends of the bearings contact with each other while the outer ends contact with the bracket wings 4.

Both sections are yieldingly held against the bracket base by spring means. The sections 6 and 7 have recesses 10 and 11 on their undersurfaces, see Figure 2, for receiving the ends of a leaf spring 12. Figure 4 illustrates how the spring 12 extends in back of the bearings 8 and 9 and further shows how the ends of the spring are received in the recesses 10 and 11. The tendency of the spring is to swing the sections beyond a vertical plane toward the bracket base and this will cause the sections to yieldingly contact with the base and thus be held in a vertical position. Figure 5 shows the sections provided with flanges 13 that normally rest against the base of the bracket and acts as stops for the sections. If desired, sound deadening material may be placed between the bracket base and the flanges.

From the foregoing description of the various parts of the device, the operation thereof may be readily understood.

As already stated, the leaf spring 12 will hold the bumper guard sections in a vertical position and therefore the guard will resemble and function as a standard one. Any force exerted against the guard in the direction toward the car, will be resisted in the same manner as though both sections were integral and rigidly attached to the bumper. When, however, the upper or lower section becomes engaged with a bumper or other portion of another car, it is merely necessary to reverse the movement of the first car and move the engaged section from the other car. The engaged section will freely swing about its rivet 5 during this movement and will permit the parts to free themselves. The hinge is such that either section 6 or 7 may swing through an arc greater than 90°. This will prevent the bumper or other portion of the adjacent car from being supported by the section 6, for example during the disengagement of the two. The spring will instantly return the swung section back into a vertical position when the section is freed and the guard will be ready for further use. It will be seen that no harm can be done to the guard because of this arrangement.

In Figures 6 and 7 I show a slightly modified form of the invention, wherein a coil spring 14 is shown mounted on a rivet 15 and the coil spring takes the place of the leaf spring 12. The bumper guard sections 16 and 17 are pivoted to the rivet and the rivet is supported by a bracket 18 that is mounted on a bumper 19. A rubber washer or base 20 may be placed between the bumper and the bracket. One end 14a of the spring engages with the upper section 16 of the bumper guard and the other end 14b engages with the lower section 17.

The coil spring 14 will hold the sections 16 and 17 in vertical position because the ends 14a and 14b will be received in sleeves 16a and 17a that are integral with the sections. The tendency of the spring ends will be to swing the sections into abutting relation with the bracket base. Each section is free to swing away from the bumper when it interlocks with an object and the driver reverses the movement of the car to free the guard section. As soon as the bumper section is freed, the spring will instantly return it to normal position where it will be ready for further use.

While I have shown only the preferred forms of my invention, it should be understood that various changes or modifications may be made within the scope of the appended claim without departing from the spirit of the invention.

I claim:

The combination with a bumper, of a resilient pad secured to the front face of the bumper, a bracket having a base secured to the pad and having two vertically-disposed sides, a pin carried by the sides and being disposed in a horizontal position, two identical guard members pivoted to the pin, one projecting above and the other below the bumper, each member having a pocket, and a leaf spring having its ends receivable in the pockets and having its midportion disposed between the pin and bracket base, said spring holding both members in yielding engagement with the bracket base.

JAMES E. SMITH.